Dec. 22, 1936.  G. H. HORN  2,065,466
APPARATUS FOR WASHING MILK CANS AND THE LIKE
Filed Nov. 4, 1933
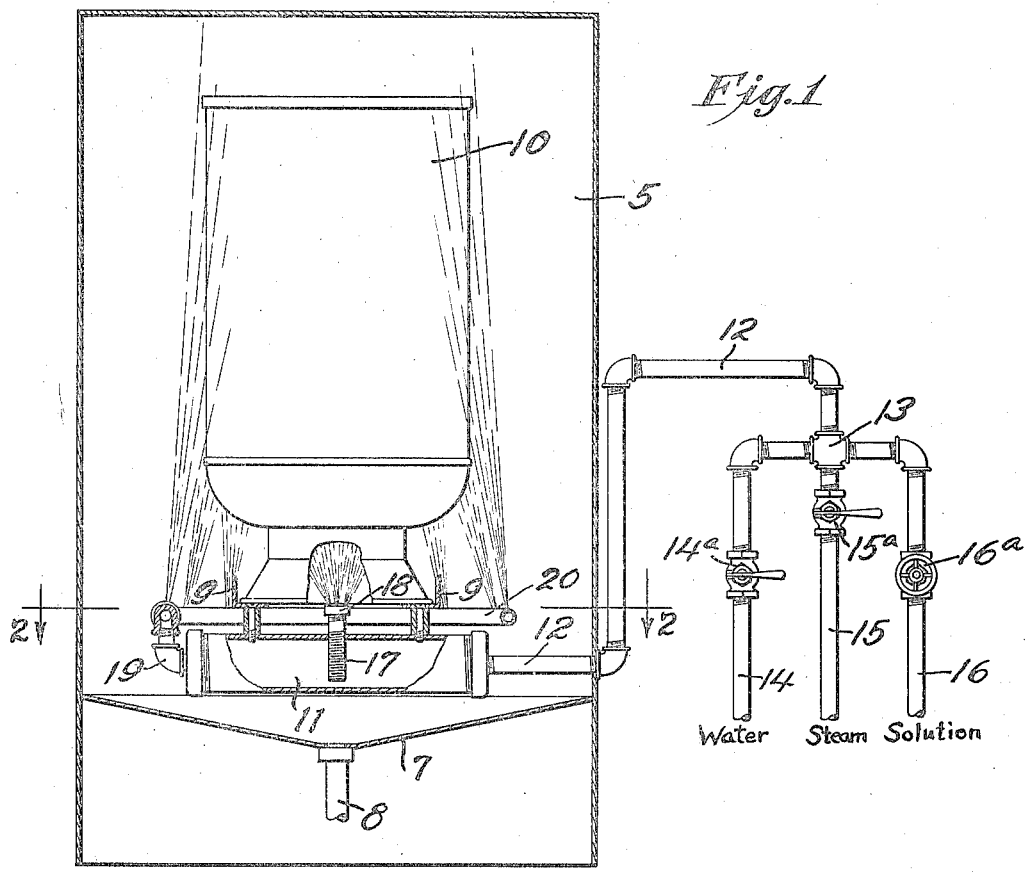
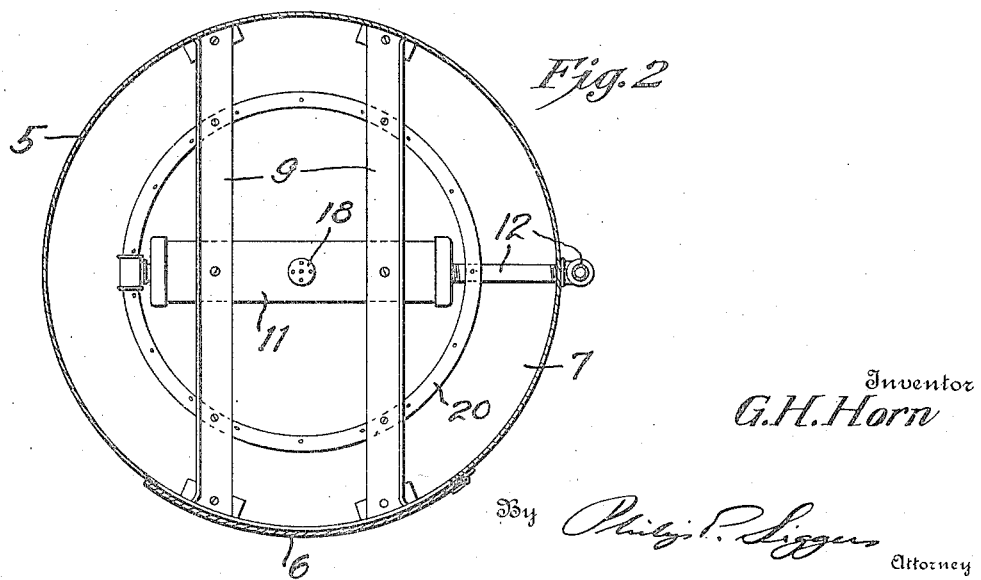
Inventor
G. H. Horn
By Philip P. Liggus
Attorney Patented Dec. 22, 1936

2,065,466

UNITED STATES PATENT OFFICE 2,065,466

APPARATUS FOR WASHING MILK CANS AND THE LIKE

George H. Horn, Vesper, Wis.

Application November 4, 1933, Serial No. 696,729

1 Claim. (Cl. 141—7)

This invention relates to apparatus for washing and/or sterilizing milk cans and the like, and among other objects, aims to provide improved apparatus of the stated character which will thoroughly cleanse all the surfaces of a standard milk can with a sprayed solution whose temperature, force and cleansing or sterilizing strength may be accurately controlled. The invention also provides apparatus which permits substantially all the sprayed solution to be recovered and used again.

In the accompanying drawing showing a preferred embodiment of the invention,—

Fig. 1 is a vertical, longitudinal section through the apparatus, showing a can being washed;

Fig. 2 is a horizontal section on line 2—2 of Fig. 1.

Referring particularly to the drawing, there is shown a closed tank 5 having a hinged door 6 in its side, with a bottom 7 draining toward the center, where a drain pipe 8 draws off the fluid, said drain pipe leading to apparatus (not shown) by which the fluid may be purified and used again, or else to a sewer. The door 6 is of sufficient size to permit placing a standard milk can inside the tank, the can being introduced laterally and standing upside down. To support a can in such a position inside the tank, a pair of horizontal angles 9 extend crosswise of the tank, from a point just below the lower edge of the opening which is closed by door 6 to the opposite side of the tank, said angles being spaced apart just far enough to receive between them the top rim of a standard milk can 10.

Supported below and by the angles 9 is a mixing tank 11 which is in the nature of a distributor for the fluid sprayed over the surfaces of the cans. A supply pipe 12 is connected at one end to the mixing tank and at the other end to a cross 13 by which three pipe lines 14, 15, 16 supply water, steam and cleansing and/or sterilizing solution respectively to the supply pipe. Valves 14a, 15a, 16a, respectively, control the flow of the fluids through said pipes, and another valve (not shown) may control the flow through pipe 12. In the center of the mixing tank, a screw nipple 17 passes through the tank wall and extends nearly to the bottom of the mixing tank. A spray nozzle 18 is on the outer end of the nipple, which obviously may be adjusted to elevate or lower said nozzle. The nipple 17 extends nearly to the bottom of the mixing tank so as to insure delivery of a considerable amount of fluid to the interior of the can. If the nipple extended only half-way into the mixing tank, the steam blast from the discharge end of the pipe 12 might cut off almost all the flow through the nipple, thus spraying an excessive proportion of the solution on the outside of the can. The arrangement shown insures a proper distribution of the solution both inside and outside.

At the end of the mixing tank opposite to pipe 12 a pipe connection 19 provides an outlet leading to a circular header or spray ring 20 which is perforated to cause a series of jets of the solution under pressure to completely surround the side walls of the can with a "curtain" of sprayed solution, as indicated in Fig. 1. Obviously the pipe 20 may be above the can, instead of below, as shown, and the result will be approximately the same, although the necks of the cans will be more thoroughly cleansed by the arrangement shown. All the solution so sprayed is kept within the tank 5 until it drains out through pipe 8 at the bottom.

The described apparatus is easily built and assembled, being made of commercial parts, and is very efficient in thoroughly cleansing and/or sterilizing milk cans and similar containers, and hence may be used advantageously at milk stations, ice cream factories and other places where containers must be cleaned before re-using.

Obviously, the present invention is not restricted to the particular embodiment thereof herein shown and described.

Having described a preferred embodiment of my invention, what I claim as new and desire to secure by Letters Patent is:—

Apparatus of the character described comprising, in combination, a closed tank having a door; a support inside the tank for the receptacle to be washed; a mixing tank inside said closed tank and below the receptacle support; a perforated pipe connected to the mixing tank but lying wholly below the receptacle and being of such size and shape and having its perforations so arranged as to project fluid around the entire outside surface of a receptacle when on said support; an upstanding nipple connected to the interior of the mixing tank; a nozzle on the upper end of the nipple; said nozzle being attached to project fluid up inside the receptacle; and means to supply cleansing fluids under pressure to the mixing tank.

GEORGE H. HORN.